United States Patent
Woodruff

(10) Patent No.: US 12,193,174 B2
(45) Date of Patent: Jan. 7, 2025

(54) THERMAL SLEEVE WITH REFLECTIVE POSITIONING MEMBER, ASSEMBLY THEREWITH AND METHOD OF CONSTRUCTION THEREOF

(71) Applicant: Federal-Mogul Powertrain, LLC, Southfield, MI (US)

(72) Inventor: Alexa A. Woodruff, Bryn Mawr, PA (US)

(73) Assignee: FEDERAL-MOGUL POWERTRAIN, LLC, Southfield, MI (US)

( * ) Notice: Subject to any disclaimer, the term of this patent is extended or adjusted under 35 U.S.C. 154(b) by 1441 days.

(21) Appl. No.: 15/227,329

(22) Filed: Aug. 3, 2016

(65) Prior Publication Data

US 2017/0042050 A1 Feb. 9, 2017

Related U.S. Application Data

(60) Provisional application No. 62/200,802, filed on Aug. 4, 2015.

(51) Int. Cl.
*H05K 5/02* (2006.01)
*B60R 16/02* (2006.01)
(Continued)

(52) U.S. Cl.
CPC ....... *H05K 5/0213* (2013.01); *B60R 16/0215* (2013.01); *G01D 11/245* (2013.01); *H01B 7/292* (2013.01)

(58) Field of Classification Search
CPC .. B60R 16/0215; G01D 11/245; H01B 7/292; H02G 3/0412; F16L 3/2236; F16L 3/2332; F16L 3/00; F16L 11/00; H05K 5/0213

(Continued)

(56) References Cited

U.S. PATENT DOCUMENTS 4,751,350 A 6/1988 Eaton
4,963,700 A * 10/1990 Olsen ............... H02G 15/18
174/138 F (Continued)

FOREIGN PATENT DOCUMENTS

JP 2008513702 A 5/2008
JP 2010523000 A 7/2010

OTHER PUBLICATIONS

International Search Report, mailed Nov. 10, 2016 (PCT/US2016/045460).

*Primary Examiner* — James C Yager
*Assistant Examiner* — Thomas J Kessler
(74) *Attorney, Agent, or Firm* — Robert L. Stearns; Dickinson Wright PLLC

(57) ABSTRACT

A thermal sleeve for protecting an electronic member connected to a wiring harness against exposure to heat is provided. The thermal sleeve has a tubular member including a circumferentially continuous wall with an inner surface bounding an inner cavity extending along a central axis between open opposite ends and a reflective outer surface. The thermal sleeve includes a positioning member constructed of a separate piece of material from the tubular member. The positioning member has a circumferentially continuous, tubular portion and at least one resilient flange extending radially inwardly from the tubular portion for abutment with the wiring harness. The tubular portion has a plurality of tangs extending radially therefrom. The tangs are fixedly disposed in the wall of the tubular member to inhibit relative rotational and/or axial movement between the tubular member and the positioning device.

11 Claims, 6 Drawing Sheets

(51) Int. Cl.
*G01D 11/24* (2006.01)
*H01B 7/29* (2006.01)

(58) Field of Classification Search
USPC .................................................... 428/36.91
See application file for complete search history.

(56) References Cited

U.S. PATENT DOCUMENTS

| | | |
|---|---|---|
| 6,913,292 B2 | 7/2005 | Snyder, Sr. et al. |
| 8,263,866 B2 | 9/2012 | Sellis et al. |
| 2002/0143287 A1* | 10/2002 | Buzot ................ A61F 13/2085 604/14 |
| 2002/0185868 A1* | 12/2002 | Snyder, Sr. ........... F16L 37/091 285/374 |
| 2005/0191882 A1* | 9/2005 | Torii ........................ H01R 4/22 439/98 |
| 2006/0005990 A1* | 1/2006 | Fukuda .............. H01R 13/5216 174/74 A |
| 2006/0054763 A1 | 3/2006 | Fryberger, Jr. et al. |
| 2007/0191755 A1* | 8/2007 | Sellis ................. B60R 16/0222 604/15 |
| 2010/0218956 A1* | 9/2010 | Buytaert ................ E21B 19/24 166/382 |

* cited by examiner

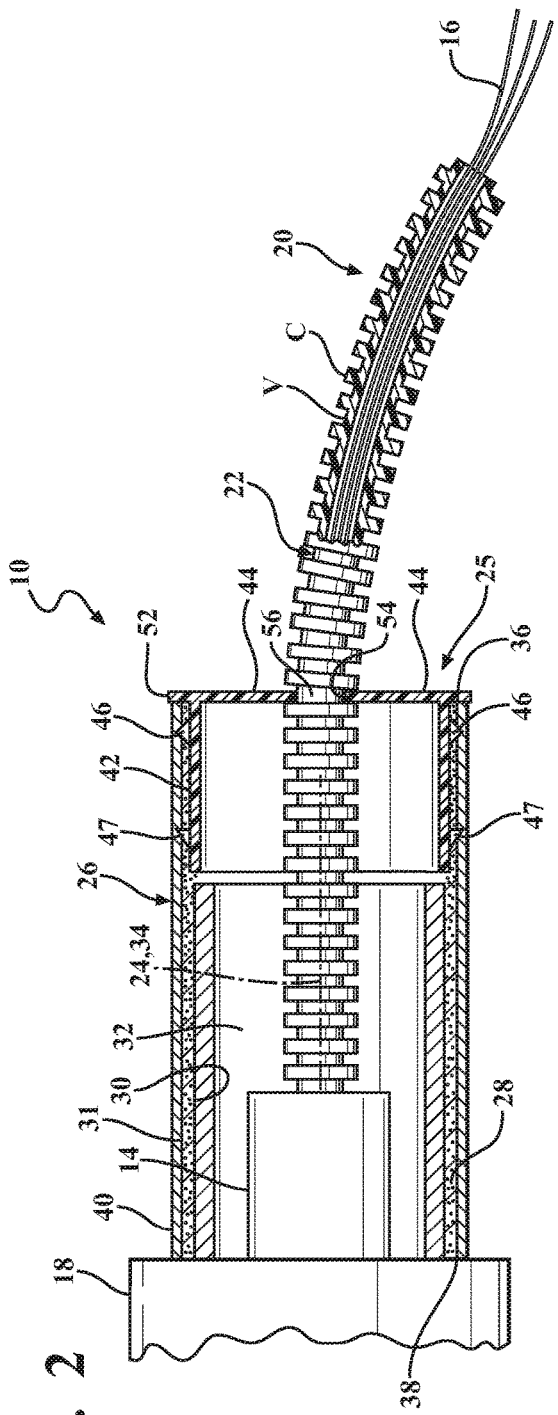
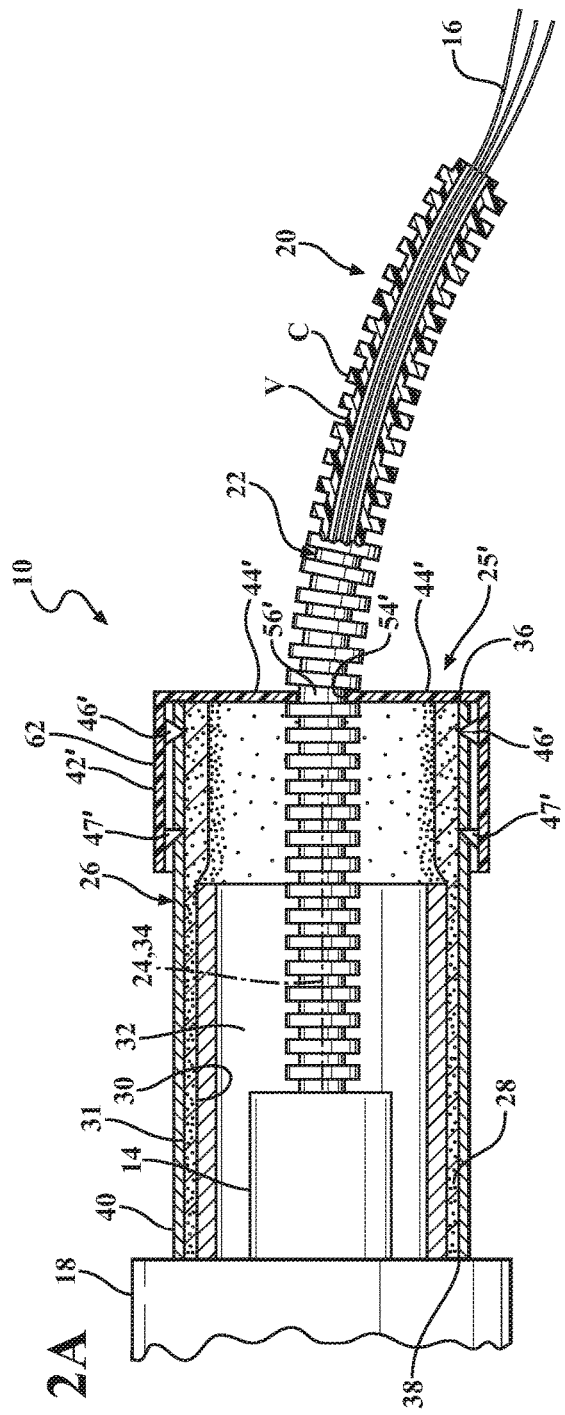

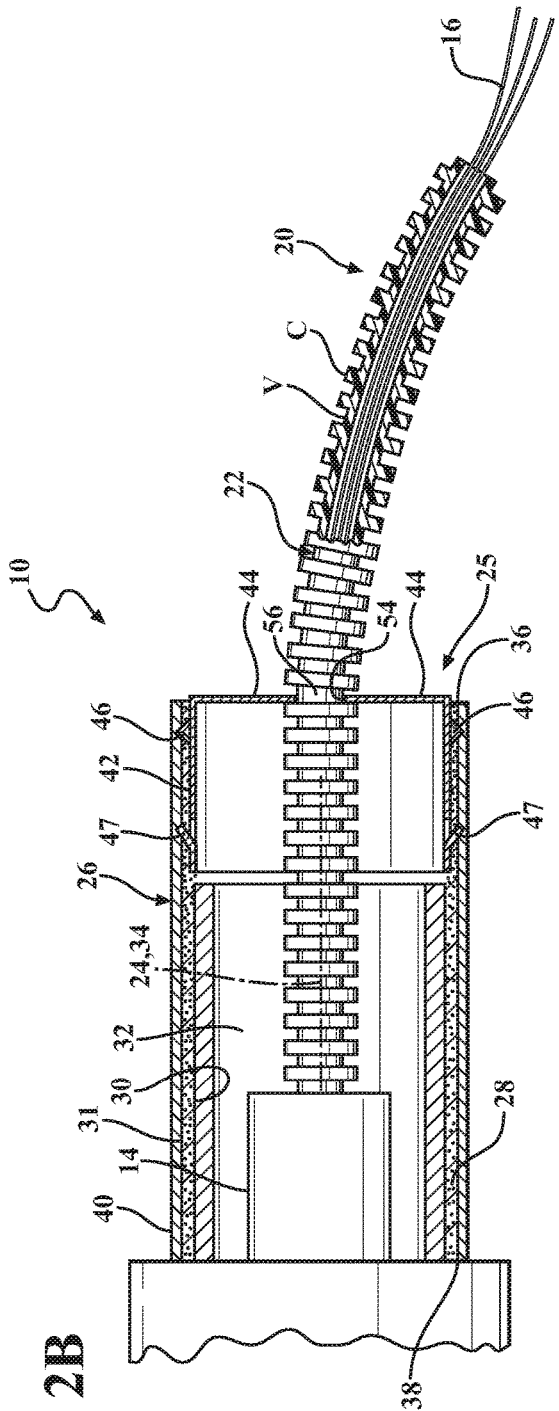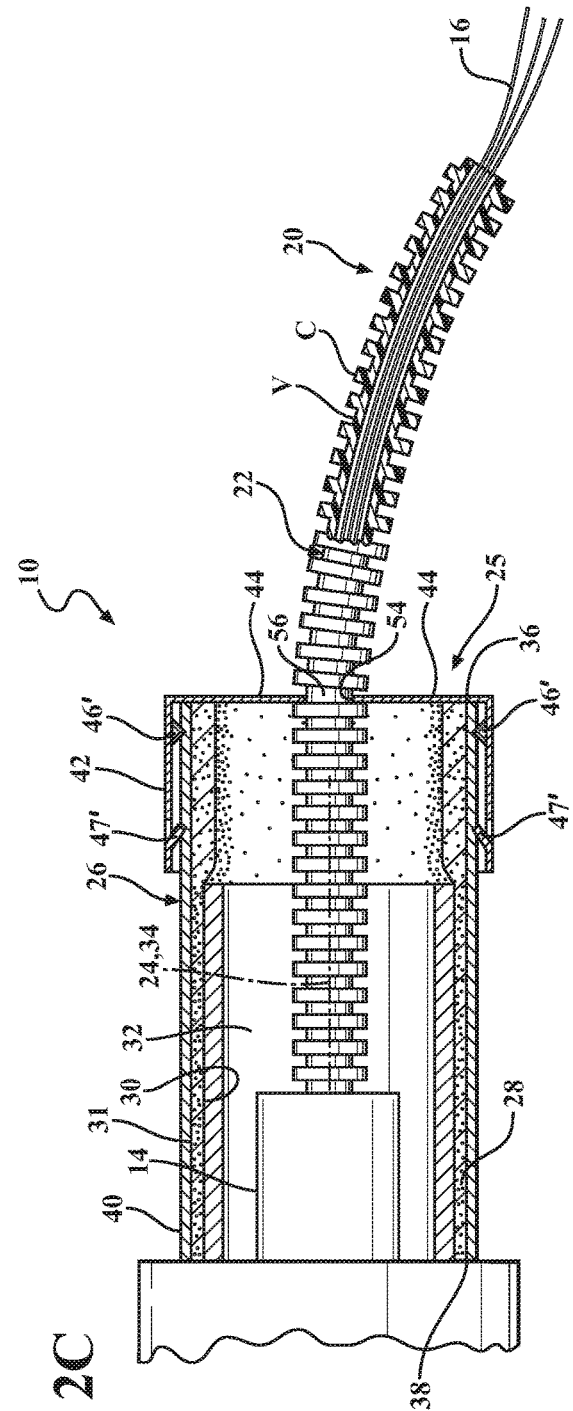

THERMAL SLEEVE WITH REFLECTIVE POSITIONING MEMBER, ASSEMBLY THEREWITH AND METHOD OF CONSTRUCTION THEREOF

CROSS-REFERENCE TO RELATED APPLICATION

This application claims the benefit of U.S. Provisional Application Ser. No. 62/200,802, filed Aug. 4, 2015, which is incorporated herein by reference in its entirety.

BACKGROUND OF THE INVENTION

1. Technical Field

This invention relates generally to tubular sleeve assemblies that provide thermal protection to an electronic object contained therein, and more particularly to a tubular sleeve assembly including a positioning member to maintain the assembly in a selectively releasable, fixed position about the electronic object contained therein.

2. Related Art

Sensors used in automotive applications, such as oxygen sensors which provide data to control engine operation and performance, are often mounted within the engine compartment of a vehicle where they are subject to harsh environmental elements including intense radiant heat and sources of abrasion and vibration during vehicle operation. Due to the harsh environmental elements, it is advantageous, and in many cases a requirement, to cover the relatively delicate, temperature sensitive sensors with a protective sleeve in an effort to dampen vibration, provide protection against abrasion and shield radiant heat from reaching the sensor. Such sleeves generally comprise an elongated, cylindrical tube extending between opposite, open free ends. The cylindrical tube generally includes a damping inner layer, such as of a nonwoven material, for example, polyester felt and a reflective outer layer comprising, for example, an aluminum foil layer laminated to an outer surface of the inner layer.

Due to the configuration of the protective cylindrical sleeve and its harsh environment, it is typically difficult to assemble the sleeve about the sensor in a manner which allows the sleeve to be reliably secured and maintained in a desired position, while at the same time providing a mechanism in which to readily remove the sleeve for servicing of the sensor. Adhesives, tape and interference fits of the entirety of an inner surface of the cylindrical wall of the sleeve are used to effect attachment, but each of these mechanisms suffer various disadvantages. Adhesive attachment of the sleeve about the sensor, while generally secure, at least initially, permanently attaches the sleeve to the sensor, and thus, complicates servicing the sensor at a future time, and in addition, the adhesives can breakdown over time, thereby causing the sleeve to become dislodged from its desired protective position about the sensor. As a result, while in its initially bonded position, this method does not allow for easy removal of the sleeve for servicing of the sensor or reuse of the sleeve, as it requires destroying the bond joint of the adhesive. In addition, tape and interference fits can be unreliable in view of the heat and vibration encountered within the engine compartment, with tapes further being particularly burdensome to apply, and interference friction fits suffering from variances in component tolerances, and difficulty of assembly, particularly if the interference is too great, or if the sleeve needs to traverse increased diameter obstacles along the path of assembly, such as a connector, for example.

A further known mechanism includes the use of an end cap made as a separate component from the tubular sleeve, wherein the end cap is fastened to the sleeve via use of a separate, secondary fastening device, such as staples, tape and/or an adhesive. Although the separate fastening device can prove useful in function, it adds cost and complexity to the assembly as a result of having to maintain and use separate fastening components and processes to apply and fasten the devices, thereby adding complexity and cost to the manufacture and assembly of the insulative sleeve.

SUMMARY OF THE INVENTION

In accordance with one aspect of the invention, a thermal sleeve for protecting an electronic member connected to a wiring harness against exposure to heat is provided. The thermal sleeve has a tubular member including a circumferentially continuous wall with an inner surface bounding an inner cavity extending along a central axis between open opposite ends and a reflective outer surface. Further, the thermal sleeve includes a positioning member constructed of a separate piece of material from the tubular member. The positioning member has a tubular portion and at least one resilient flange extending radially inwardly from the tubular portion for abutment with the wiring harness. The tubular portion has a plurality of tangs extending radially from the tubular portion. The tangs are fixedly disposed in the wall of the tubular member to inhibit relative movement between the tubular member and the positioning device.

In accordance with another aspect of the invention, the tangs can be formed to extend radially outwardly from the tubular portion of the positioning member.

In accordance with another aspect of the invention, the tangs can be formed to extend radially inwardly from the tubular portion of the positioning member.

In accordance with another aspect of the invention, the tangs can extend circumferentially relative to the central axis to inhibit relative rotational movement between the tubular member and the positioning device.

In accordance with another aspect of the invention, the tangs can extend axially relative to the central axis to inhibit relative axial movement of the tubular member away from the positioning device.

In accordance with another aspect of the invention, the positioning device can be provided with a reflective outer surface to enhance the ability to shield the inner cavity from exposure to heat.

In accordance with another aspect of the invention, the tangs can be formed from plastic.

In accordance with another aspect of the invention, the tangs can be formed from metal.

In accordance with another aspect of the invention, a thermal sleeve in combination with a wiring harness configured in electrical communication with a sensor is provided. The thermal sleeve includes a tubular member having a circumferentially continuous wall with an inner surface bounding an inner cavity extending along a central axis between open opposite ends and a reflective outer surface. The sleeve further includes a positioning member constructed of a separate piece of material from the tubular member. The positioning member has a tubular portion and at least one resilient flange extending radially inwardly from the tubular portion for abutment with the wiring harness to releasably fix the thermal sleeve axially along the wiring harness. A plurality of tangs extend radially from the tubular portion, wherein the tangs are fixedly disposed in the wall of the tubular member to inhibit relative movement between said tubular member and said positioning device.

In accordance with another aspect of the invention, at least some of the tangs can be formed to extend circumferentially relative to the central axis and at least some of the tangs can be formed to extend axially relative to the central axis to inhibit respective relative rotational and axial movement between the tubular member and the positioning device.

In accordance with another aspect of the invention, a method of constructing a sleeve for protecting an electronic member connected to a wiring harness against external thermal effects is provided. The method includes providing a tubular member having a circumferentially continuous wall with an inner surface bounding an inner cavity extending along a central axis between open opposite ends and a having a reflective outer surface. Further, providing a positioning member constructed of a separate piece of material from the tubular member. Further, providing the positioning member having a tubular portion and at least one resilient flange extending radially inwardly from the tubular portion for abutment with the wiring harness, with the tubular portion having a plurality of tangs extending radially therefrom. Then, fixing the tangs in the wall of said tubular member to inhibit relative movement between the tubular member and the positioning device.

In accordance with another aspect of the invention, the method can include providing the tangs from material punched from the tubular portion of the positioning device.

In accordance with another aspect of the invention, the method can include providing the tangs from material punched radially inwardly from the tubular portion of the positioning device.

In accordance with another aspect of the invention, the method can include providing the tangs from material punched radially outwardly from the tubular portion of the positioning device.

In accordance with another aspect of the invention, the method can include providing the tangs from material molded to extend radially inwardly from the tubular portion of the positioning device.

In accordance with another aspect of the invention, the method can include providing the tangs from material molded to extend radially outwardly from the tubular portion of the positioning device.

In accordance with another aspect of the invention, the method can include penetrating the inner surface of the tubular portion with the tangs.

In accordance with another aspect of the invention, the method can include penetrating the outer surface of the tubular portion with the tangs.

BRIEF DESCRIPTION OF THE DRAWINGS

These and other features and advantages of the present invention will become more readily appreciated when considered in connection with the following detailed description of presently preferred embodiments and best mode, appended claims and accompanying drawings, in which:

FIG. 2 is a schematic, partially cross-sectioned side view of a thermal sleeve assembly constructed in accordance with one embodiment of the invention shown in an assembled state;

FIG. 2A is a view similar to FIG. 2 showing a thermal sleeve assembly constructed in accordance with another embodiment of the invention;

FIG. 2B is a view similar to FIG. 2 showing a thermal sleeve assembly constructed in accordance with yet another embodiment of the invention;

FIG. 2C is a view similar to FIG. 2 showing a thermal sleeve assembly constructed in accordance with yet another embodiment of the invention;

DETAILED DESCRIPTION OF PREFERRED EMBODIMENTS

Figure 1:
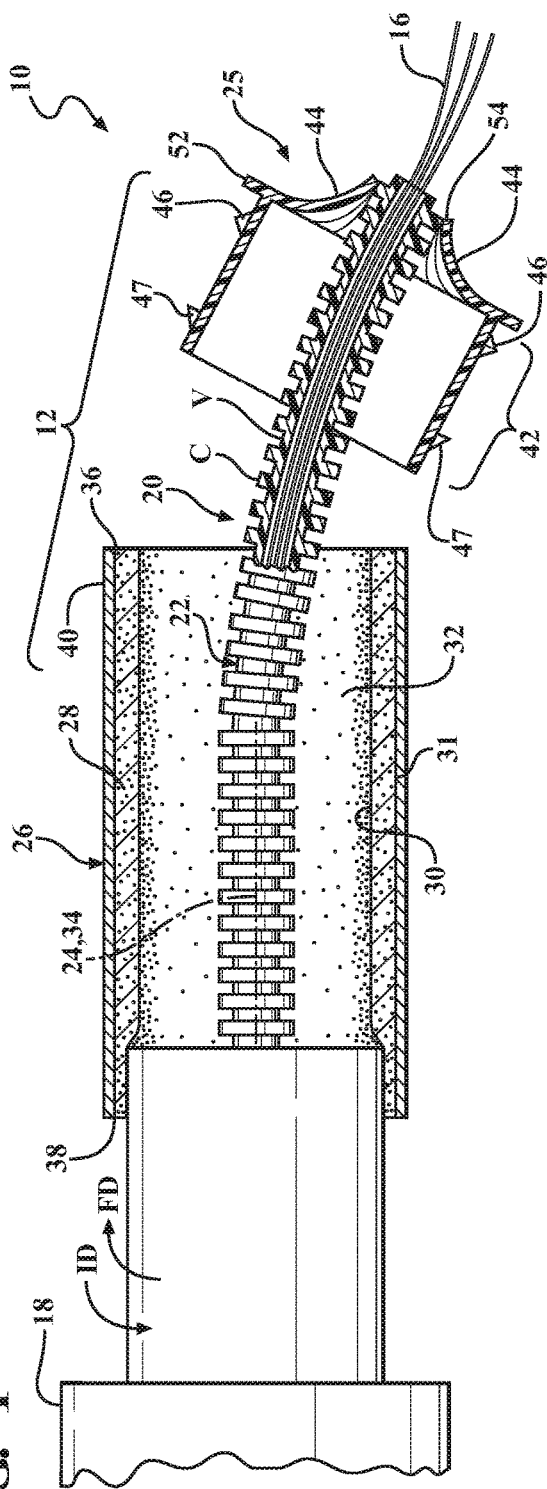
FIG. 1 is a schematic, partially cross-sectioned, exploded side view of a thermal sleeve assembly constructed in accordance with one aspect of the invention for protecting an electrical component.
Figure 1A:
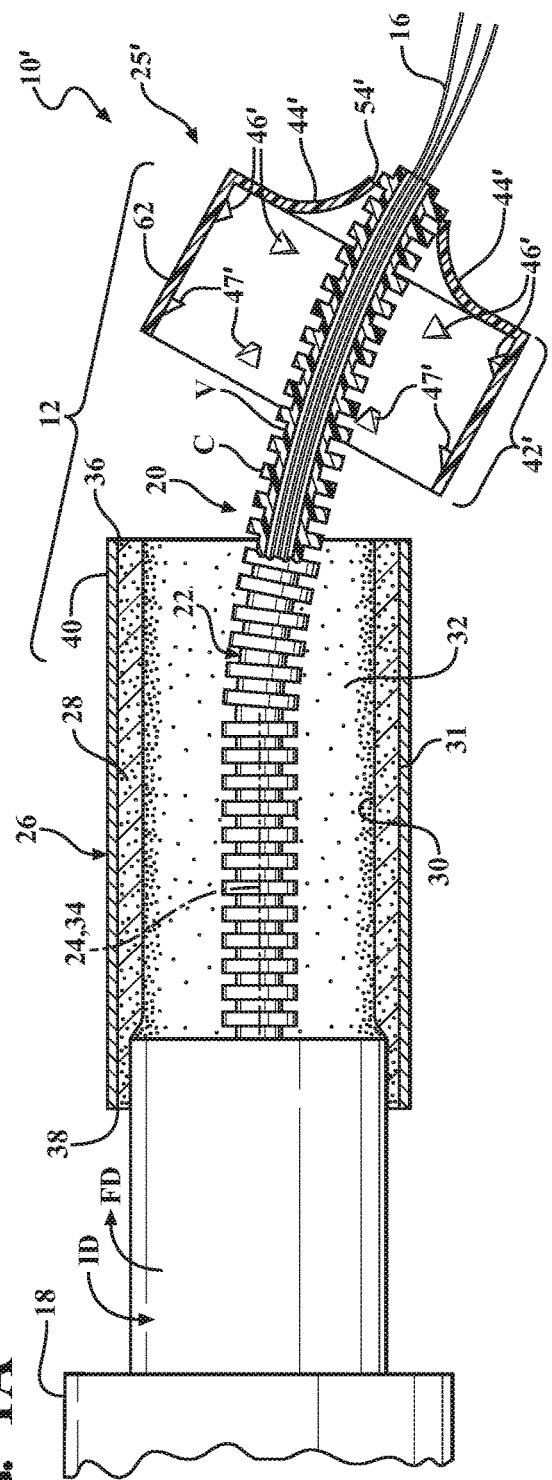
FIG. 1A is a view similar to FIG. 1 of a thermal sleeve assembly constructed in accordance with another aspect of the invention for protecting an electrical component.

Referring in more detail to the drawings, FIGS. 1 and 2 show an assembly 10 and FIGS. 1A and 2A show an assembly 10', with each being constructed in accordance with alternate embodiments of the invention, wherein the same reference numerals are used to identify like features, unless otherwise specified. The assemblies 10, 10' include a thermal sleeve 12 with self-retaining positioning member 25, 25', respectively, for protecting an electrical member 14, such as sensor, contained at least in part within the sleeve 12 against the effects of extreme radiant heat, abrasion, contamination and vibration, wherein the sensor 14 is shown as being connected to an end of a wire harness 16 on an engine component 18 of a vehicle (FIGS. 2, 2A). The features of the self-retaining positioning members 25, 25' are identified by the same reference numerals, offset respectively by a prime symbol ('). The wire harness 16 can be provided as a bundle of exposed, insulated wires or as a bundle of insulated wires enclosed within an outer protective sheath or sleeve, also referred to as tube 20, such as a tube having a generally smooth or convolute outer surface 22, by way of example and without limitation. The sleeve 12 is configured for slidable movement along a longitudinal axis 24 of the wire harness 16 and tube 20, if provided, to bring the sleeve 12 into its desired protective position about the sensor 14. The sleeve 12 is configured, via the self-retaining positioning member 25, 25', as discussed in further detail below, to remain fixed in the protective position until desired to selectively slide the sleeve 12 away from its protective position, such as may be desired to service the sensor 14. The sleeve 12 remains in its protective position during use, without need of secondary fasteners, such as tape or adhesives, and thus, the assembly 10, 10' is made simple, aesthetically pleasing, and economical in manufacture and use.

The sleeve 12 can be constructed having any desired length. The sleeve 12 has a tubular member 26 including a circumferentially continuous inner wall 28 with an inner surface 30 and an outer surface 31, with the inner surface 30 bounding an inner cavity 32 and extending along a central longitudinal axis 34 between open opposite ends 36, 38. The tubular member 26 further includes a reflective outer surface 40 on the outer surface 31. The inner wall 28, in accordance with one aspect of the invention, can be constructed of a intertwined fibrous nonwoven material, woven material, knit material, or braided material, and can be constructed having any desired wall thicknesses, depending on the nature and severity of heat exposure in the intended environment.

The reflective outer surface 40 is provided to reflect extreme radiant heat typical of an engine compartment, including temperatures generated by an exhaust system. The outer layer 40 can be formed of any suitable metallic material, including a reflective metallic coating or foil layer of aluminum or other desired metal foils, by way of example and without limitation. The reflective outer layer 40 is relatively thin, thereby allowing the sleeve 12 to remain flexible over meandering paths and corners. The outer layer 40, if provided as a foil layer, can be spiral wrapped or cigarette wrapped about the inner wall 28, as desired. Any suitable, heat resistant adhesive can be used to facilitate bonding the outer foil layer 40 to the outer surface 31 of the inner wall 28, if desired.

The self-retaining positioning member, referred hereafter simply as positioning member 25, 25', is constructed of a separate piece of material from the tubular member 26. The positioning member 25, 25' has a tubular portion 42, 42' and at least one resilient flange, also referred to as finger 44, 44', and shown as a plurality of fingers 44, 44' extending radially inwardly from the tubular portion 42, 42' for abutment with the wiring harness 16, or the tube 20, if provided. The tubular portion 42, 42' has a plurality of tangs, shown as respective first and second tangs 46, 47; 46', 47' extending radially from the tubular portion 42, 42', with the first and second tangs 46, 47; 46', 47' being fixedly disposed in the tubular member 26 to inhibit relative movement between the tubular member 26 and the positioning member 25, 25'. The tubular portion 42 of FIG. 2 is shown as being sized for receipt inside the open end 36 of the tubular member 26, with the tangs 46, 47 extending radially outwardly from the tubular portion 42 for penetrating receipt within the inner surface 30 of the inner wall 28. In contrast, the tubular portion 42' of FIG. 2A is shown as being sized for receipt outside the open end 36 of the tubular member 26, with the tangs 46', 47' extending radially inwardly from the tubular portion 42' for penetrating receipt within the outer surface 31 of the tubular member 26. Given the tubular portion 42' is outside the tubular member 26, an outer surface 60 of the tubular portion 42' can be provided with a reflective surface 62, similar or the same as the reflective outer surface 40 of the tubular member 26, thereby ensuring full protection is provided against external radiant heat.

A first plurality of the first tangs 46, 46' are shown extending along a circumferentially extending row and pointing in a circumferential direction, such that the first tangs 46, 46', when embedded in the inner wall 28, function to inhibit relative rotation between the positioning member 25, 25' and the tubular member 26. During assembly of the positioning member 25, 25' onto the end 36 of the tubular member 26, the positioning member 25, 25' can be rotated in an installation direction, illustrated by arrow ID, to initially prevent penetration of the first tangs 46, 46' into the respective inner and outer surface 30, 31, and then, upon installation, the positioning member 25, 25' can be rotated in an opposite fixing direction, illustrated by arrow FD, to cause penetration of the first tangs 46, 46' into the respective inner and outer surface 30, 31.

The second plurality of the tangs 47, 47' are shown extending along a circumferentially extending row in axially spaced relation from the first tangs 46, 46', by way of example and without limitation, with the second tangs 47, 47' pointing in an axial direction, such that the second tangs 47, 47', when embedded in the inner wall 28, function to inhibit relative axial movement between the positioning member 25, 25' and the tubular member 26, such that the positioning member 25, 25' and the tubular member 26 are fixed against axial separation from one another. Accordingly, the tangs 46, 47 of the positioning member 25, and the tangs 46', 47' of the positioning member 25', upon being push about the end 36 and inserted into the respective inner and outer surfaces 30, 31 of the tubular member 26, function as self-retaining members, thereby doing away with the need for any secondary fasteners, such as mechanical fasteners, tapes or adhesives, to fix the positioning member 25, 25' to the tubular member 26.

It is contemplated that the positioning member 25, 25' can be made of any suitable plastic or metal material, as desired for the intended application. If made of plastic, the positioning member 25, 25' could be molded to shape, with the tangs 46, 47 of the positioning member 25 being molded to extend radially outwardly (FIG. 2) and the tangs 46', 47' of the positioning member 25' being molded to extend radially inwardly (FIG. 2A) in inclined resilient, spring-like fashion, and if made of metal, the tangs 46, 47; 46', 47' could be stamped or otherwise punched from an annulus of the tubular portion 42, 42' to extend radially outwardly (FIG. 2B) or to extend radially inwardly (FIG. 2C).

The positioning member 25, with reference to the various embodiments shown in FIGS. 3-6, which have similarities to those described and shown in U.S. Pat. No. 8,263,866, which is incorporated herein in its entirety by reference, is further shown having an annular rim 52 extending radially outwardly from the tubular portion 42 adjacent the end an end of the tubular portion 42. The rim 42 functions as a positive stop or shoulder while inserting the positioning member 25 into the end 36 of the tubular member 26, thereby assuring the positioning member 25 is properly seated and fixed to the tubular member 26.

In use, the sleeve 12 can be easily slid over the wire harness 16 or tube 20, whereupon free ends 54, 54' of the fingers 44, 44' engage and flex axially against the wires harness 16 or tube 20. A predetermined amount of friction and interference between the finger ends 54, 54' and the wire harness 16 or tube 20 can be provided by sizing an opening 56, 56' bounded by the finger ends 54, 54' in construction.

The fingers 44, 44', being flexible and resilient, are biased slightly axially via friction or interference with the wire harness 16 or tube 20 to flex axially away from the end 36 during installation and axially toward or into the sleeve end 36 during removal, such as may be required in service. If a tube 20 is provided as a corrugate tube, the fingers 44, 44' can be biased to flex axially over annular crests C during installation and removal, and can be constructed to take on a predetermined thickness to be received within annular valleys V of the corrugations to facilitate maintaining the sleeve 12 in its intended "in use" position about the sensor 14.

Figure 3:
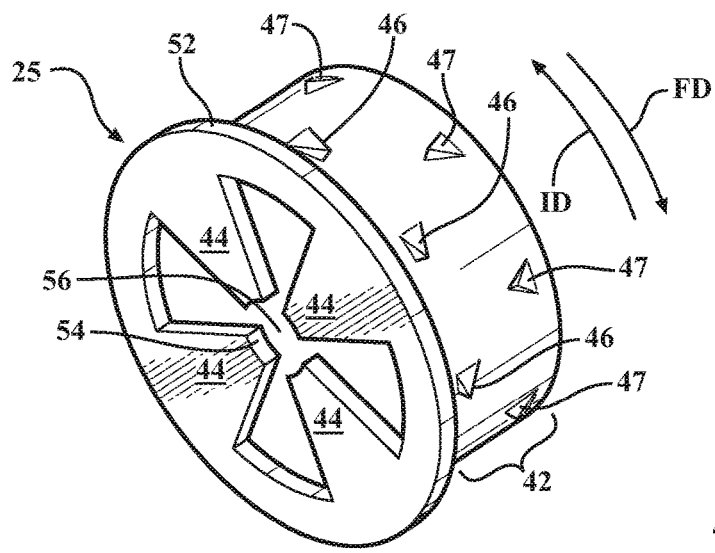
FIG. 3 is an isometric view of a self-retaining positioning member constructed in accordance with one aspect of the invention of the thermal sleeve assembly of FIG. 1.
Figure 3A:
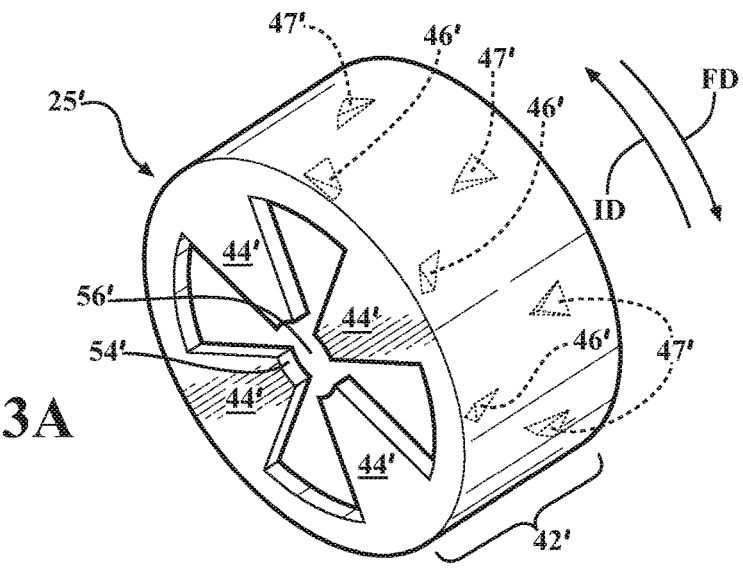
FIG. 3A is a view similar to FIG. 3 of a self-retaining positioning member constructed in accordance with another aspect of the invention of the thermal sleeve assembly of FIG. 1A.
Figure 4:
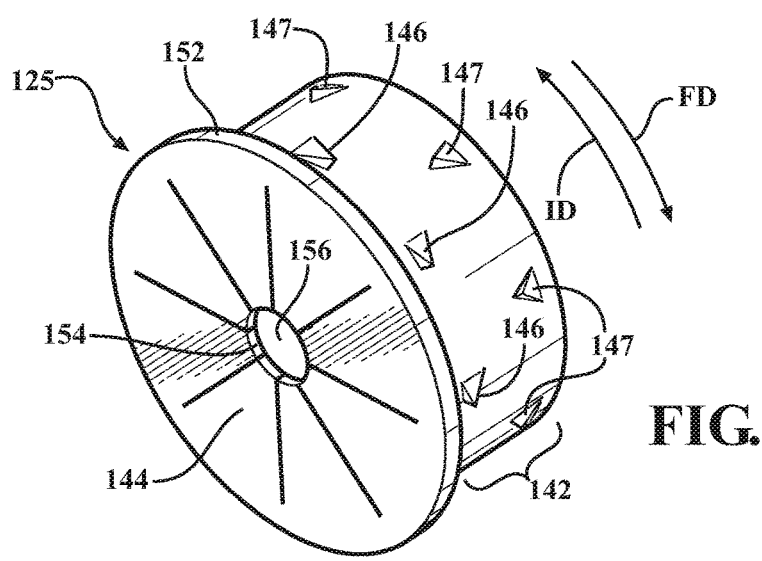
FIG. 4 is an isometric view of a self-retaining positioning member constructed in accordance with another aspect of the invention of the thermal sleeve assembly of FIG. 1.
Figure 4A:
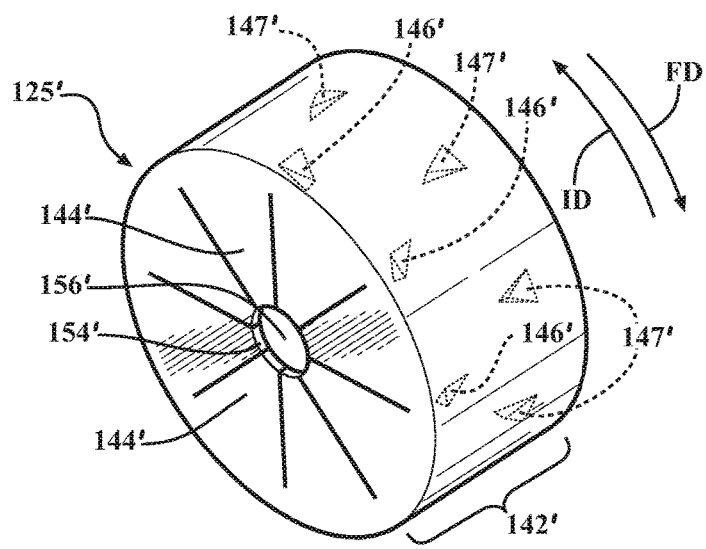
FIG. 4A is a view similar to FIG. 4 of a self-retaining positioning member constructed in accordance with another aspect of the invention of the thermal sleeve assembly of FIG. 1A.
Figure 5:
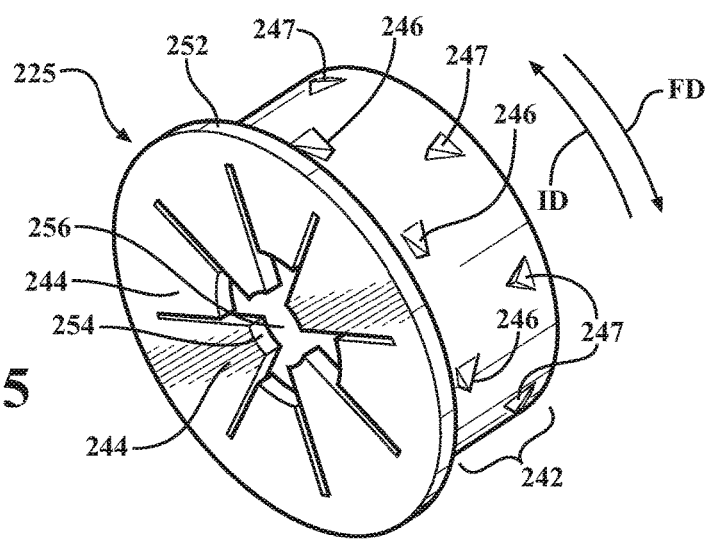
FIG. 5 is a perspective view of a self-retaining positioning member constructed in accordance with yet another aspect of the invention of the thermal sleeve assembly of FIG. 1.
Figure 5A:
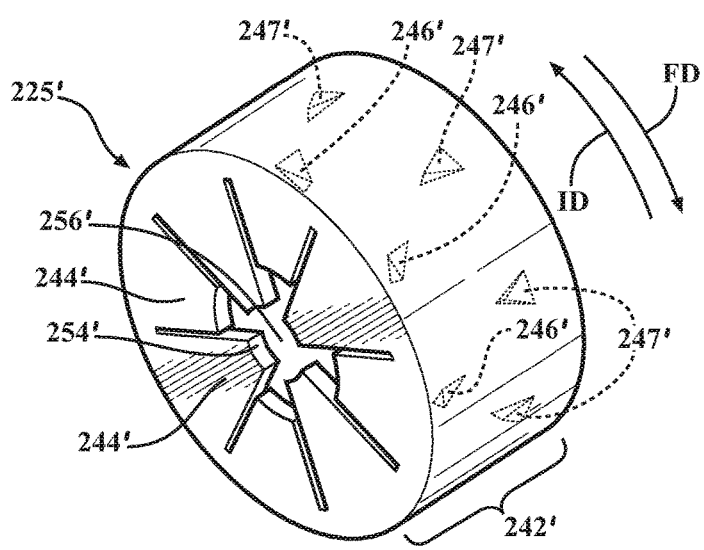
FIG. 5A is a view similar to FIG. 5 of a self-retaining positioning member constructed in accordance with another aspect of the invention of the thermal sleeve assembly of FIG. 1A.
Figure 6:
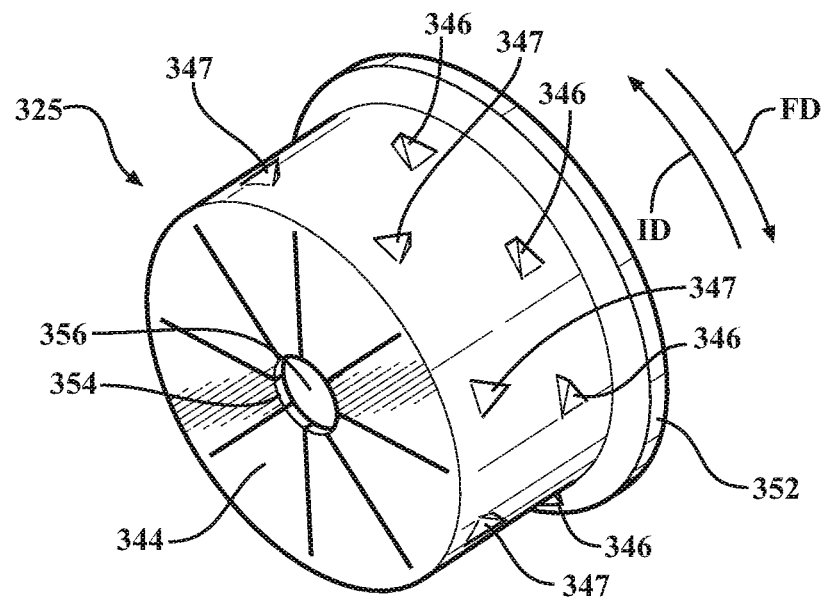
FIG. 6 is an isometric view of a self-retaining positioning member constructed in accordance with yet another aspect of the invention of the thermal sleeve assembly of FIG. 1.
Figure 7:
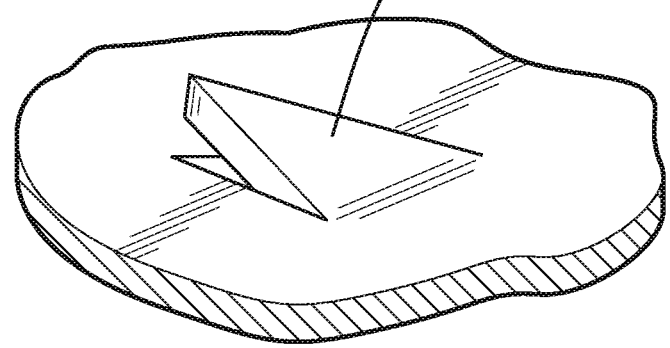
FIG. 7 is a partial isometric cross-sectional view of a self-retaining positioning member constructed in accordance with yet another aspect of the invention.

As noted, FIGS. 3 and 3A illustrate the positioning member 25, 25' constructed in accordance with alternate embodiments of the invention, while FIGS. 4-6 illustrate positioning members 125, 225, 325 and FIGS. 4A-5A illustrate positioning members 125', 225' constructed in accordance with further alternate embodiments of the invention, wherein the features of the different positioning members 125, 125', 225, 225', 325 are identified by the same reference numerals discussed above, offset by respective factors of 100, 200, 300. The embodiments shown in FIGS. 3, 3A, 4, 4A, 5, 5A and 6 are shown as being molded from plastic; however, as shown in FIG. 7, each of the embodiments can equally be made of a metal material with features, such as the tangs 46, 47; 46', 47'; 146, 147; 146', 147'; 246, 247; 246', 247'; 346, 347, be stamped therein. The fingers 44, 144, 244; 44', 144', 244' of the embodiments shown in respective FIGS. 3-5 and 3A-5A have different configurations from one another, and in FIG. 6, the rim 352 is shown at an opposite end of the positioning member 325 from the fingers 344. Each of the positioning members 25, 25', 125, 125', 225, 225', 325 include a plurality of first and second tangs 46, 47; 46', 47'; 146, 147; 146', 147'; 246, 247; 246', 247'; 346, 347 as discussed above, and thus, no further discussion is believed necessary, as the drawings clearly show the respective configurations of the tangs 46, 47; 46', 47'; 146, 147; 146', 147'; 246, 247; 246', 247'; 346, 347.

Obviously, in light of the above teachings, many modifications and variations of the present invention are possible. It is, therefore, to be understood that within the scope of the appended claims, the invention may be practiced otherwise than as specifically described.

What is claimed is:

1. A thermal sleeve for protecting an electronic member connected to a wiring harness, comprising:
   a tubular member including a circumferentially continuous wall with an inner surface bounding an inner cavity extending along a central axis between open opposite ends and a reflective outer surface; and
   a positioning member constructed of a separate piece of material from said tubular member, said positioning member having a tubular portion configured to extend along said central axis and at least one resilient flange extending radially inwardly from said tubular portion for abutment with the wiring harness, said tubular portion having a plurality of tangs extending radially therefrom, said tangs being fixedly disposed and penetrated in said wall of said tubular member to inhibit relative movement between said tubular member and said positioning member, wherein at least some of said tangs extend and point circumferentially relative to said central axis to inhibit relative rotational movement between said tubular member and said positioning member.

2. The thermal sleeve of claim 1, wherein at least some of said tangs extend and point axially relative to said central axis to inhibit relative axial movement between said tubular member and said positioning member away from one another.

3. The thermal sleeve of claim 1, wherein said tangs extend at least one of radially inwardly and radially outwardly from said tubular portion.

4. The thermal sleeve of claim 1, wherein said tangs extend radially inwardly from said tubular portion.

5. The thermal sleeve of claim 1, wherein said positioning member has a reflective outer surface.

6. The thermal sleeve of claim 1 wherein said tangs are one of metal or plastic.

7. The thermal sleeve of claim 1 wherein said tangs are metal.

8. A thermal sleeve in combination with a wiring harness configured in electrical communication with a sensor, comprising:
   a tubular member including a circumferentially continuous wall with an inner surface bounding an inner cavity extending along a central axis between open opposite ends and a reflective outer surface; and
   a positioning member constructed of a separate piece of material from said tubular member, said positioning member having a tubular portion configured to extend along said central axis and at least one resilient flange extending radially inwardly from said tubular portion for abutment with said wiring harness to releasably fix said thermal sleeve axially along said wiring harness, said tubular portion having a plurality of tangs extending radially therefrom, said tangs being fixedly disposed and penetrated in said wall of said tubular member to inhibit relative movement between said tubular member and said positioning member, wherein at least some of said tangs extend and point circumferentially relative to said central axis to inhibit relative rotational movement between said tubular member and said positioning member.

9. The combination of claim 8, wherein at least some of said tangs extend and point axially relative to said central axis to inhibit relative axial movement between said tubular member and said positioning member away from one another.

10. The combination of claim 8, wherein said tangs extend at least one of radially inwardly and radially outwardly from said tubular portion.

11. The combination of claim 8, wherein said tangs extend radially inwardly from said tubular portion.

* * * * *